US012657540B2

(12) United States Patent
Hanauer et al.

(10) Patent No.: US 12,657,540 B2
(45) Date of Patent: Jun. 16, 2026

(54) DETECTING A MISSING ASSET BASED ON AMOUNT OF WORK CYCLES

(71) Applicant: Caterpillar Inc., Peoria, IL (US)

(72) Inventors: Nicholas Adam Hanauer, Washington, IL (US); Chad Timothy Brickner, Dunlap, IL (US); Manaswini Nama, Peoria, IL (US); Bradley K. Bomer, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 757 days.

(21) Appl. No.: 17/452,637

(22) Filed: Oct. 28, 2021

(65) Prior Publication Data

US 2023/0137056 A1 May 4, 2023

(51) Int. Cl.
*G06Q 10/0639* (2023.01)
*G06F 9/455* (2018.01)
*G06Q 10/0631* (2023.01)

(52) U.S. Cl.
CPC ... *G06Q 10/0639* (2013.01); *G06Q 10/06313* (2013.01); *G06F 2009/4557* (2013.01); *G06F 2009/45591* (2013.01)

(58) Field of Classification Search
CPC ......... G06Q 10/0639; G06Q 10/06313; G06Q 10/04; G06Q 10/08; G06Q 10/06; G06F 2009/4557; G06F 2009/45591
See application file for complete search history.

(56) References Cited

U.S. PATENT DOCUMENTS

| 7,162,347 B2 | 1/2007 | Shibamori et al. |
| 7,690,565 B2 | 4/2010 | Faoro et al. |
| 7,819,312 B2 | 10/2010 | Gualandri |
| 9,460,051 B2 | 10/2016 | Horne |

(Continued)

FOREIGN PATENT DOCUMENTS

| CN | 111784404 A | * | 10/2020 | ............. G06Q 10/04 |
| JP | 6764893 B2 | | 10/2020 | |

OTHER PUBLICATIONS

Jinwoo Kim, Seokho Chi, Jongwon Seo, Interaction analysis for vision-based activity identification of earthmoving excavators and dump trucks, Automation in Construction, vol. 87, 2018, pp. 297-308, (https://www.sciencedirect.com/science/article/pii/S0926580517304193) (Year: 2018).*

(Continued)

*Primary Examiner* — Beth V Boswell

(57) ABSTRACT

A device may receive, from one or more sensor devices associated with a first machine located at a job site, motion data of the first machine. The device may determine, based on the motion data, an amount of time the first machine spent performing one or more tasks by interacting with a second machine. The device may determine a quantity of work cycles performed by the first machine. The device may generate, based on the amount of time and the quantity of work cycles, a productivity value indicating a measure of productivity of the first machine. The device may determine, based on the productivity value, that the second machine is not registered as performing work at the job site. The device may perform an action to cause second machine information regarding the second machine to be associated with job site information.

20 Claims, 5 Drawing Sheets

(56)     References Cited

U.S. PATENT DOCUMENTS

| 2008/0059411 | A1* | 3/2008 | Greiner | G06Q 10/06 |
| 2009/0063222 | A1* | 3/2009 | Doan | G06Q 10/00 |
| | | | | 705/1.1 |
| 2015/0324758 | A1* | 11/2015 | Nottoli | G06Q 10/1093 |
| | | | | 705/7.21 |
| 2016/0292933 | A1* | 10/2016 | Sprock | G06Q 50/08 |
| 2018/0174377 | A1* | 6/2018 | Collins | E02F 9/261 |
| 2019/0331481 | A1* | 10/2019 | Flood | G01P 13/04 |
| 2019/0370726 | A1 | 12/2019 | Ha | |
| 2020/0193342 | A1* | 6/2020 | Selvaraj | G07C 5/0808 |
| 2020/0327464 | A1 | 10/2020 | Kato et al. | |
| 2021/0097458 | A1 | 4/2021 | Brickner | |
| 2021/0099828 | A1 | 4/2021 | Hanna et al. | |
| 2021/0216889 | A1 | 7/2021 | Spurgeon | |

OTHER PUBLICATIONS

Written Opinion and International Search Report for Int'l. Patent
Appln. No. PCT/US2022/045965, mailed Feb. 14, 2023 (13 pgs).

* cited by examiner

500

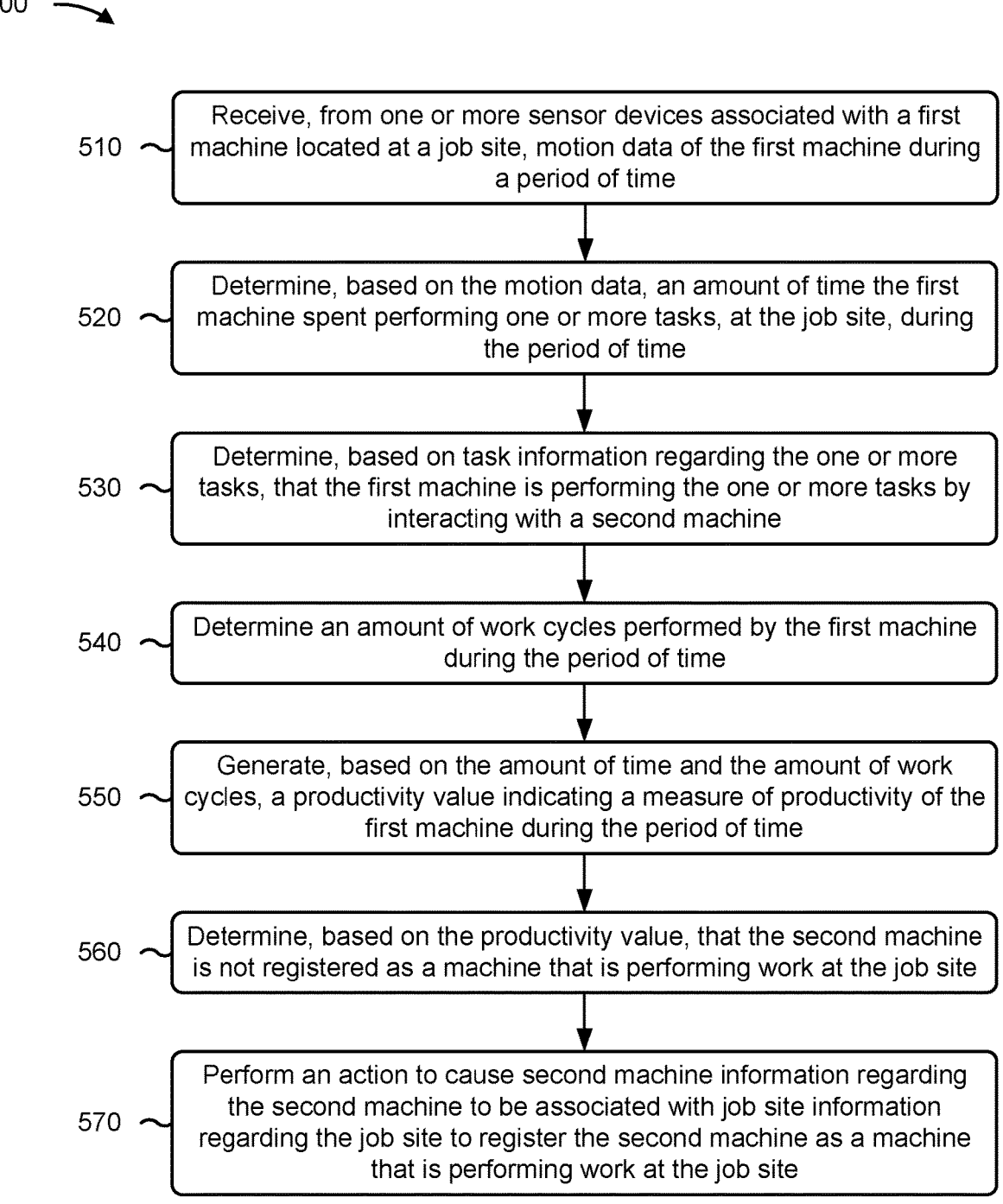

510 — Receive, from one or more sensor devices associated with a first machine located at a job site, motion data of the first machine during a period of time 520 — Determine, based on the motion data, an amount of time the first machine spent performing one or more tasks, at the job site, during the period of time 530 — Determine, based on task information regarding the one or more tasks, that the first machine is performing the one or more tasks by interacting with a second machine 540 — Determine an amount of work cycles performed by the first machine during the period of time 550 — Generate, based on the amount of time and the amount of work cycles, a productivity value indicating a measure of productivity of the first machine during the period of time 560 — Determine, based on the productivity value, that the second machine is not registered as a machine that is performing work at the job site 570 — Perform an action to cause second machine information regarding the second machine to be associated with job site information regarding the job site to register the second machine as a machine that is performing work at the job site

FIG. 5

DETECTING A MISSING ASSET BASED ON AMOUNT OF WORK CYCLES

TECHNICAL FIELD

The present disclosure relates generally to monitoring an asset and, for example, to identifying a missing asset based on a quantity of work cycles associated with the asset.

BACKGROUND

A measure of productivity may be determined for different machines at a job site. In some situations, the measure of productivity may be determined based on a quantity of work cycles performed by the machines. As an example, a work cycle may include a load event and a dump event. A first machine (that performs material hauling operations) may interact with a second machine (that performs material loading operations), as a part of a work cycle. In this regard, a quantity of work cycles of the first machine may be determined based on information regarding the first machine and/or the second machine.

In some situations, information regarding the first machine and/or the second machine may be unknown. As a result, the quantity of work cycles may be inaccurate. The inaccurate quantity of work cycles may be used by a job site device (of the job site) to generate inaccurate data regarding the job site. Generating inaccurate data in this manner may waste computing resources, network resources, and other resources associated with determining whether the first machine is experiencing a failure, re-determining a location of the first machine, determining whether the job site device is experiencing a failure, among other examples.

U.S. Patent Application Publication No. 20210099828 (the '828 publication) discloses systems, devices, and methods for managing mobile assets at a worksite. The '828 publication further discloses a system computer that creates a geofence relating to the geolocation of a first communication device disposed in a first mobile asset, the data points of the geofence periodically updated according to the geolocation of the first communication device such that changes in the geolocation of the first communication device are proportionally reflected in the updated geolocation of the datapoints of the geofence. The '828 publication additionally discloses that the cycle time of a second communication device disposed in a second mobile asset can be determined by determining the amount of time lapsed after the second communication device triggers the geofence.

While the '828 publication discloses managing mobile assets at a worksite, the '828 publication does not address the problems regarding inaccurate amounts of work cycles, as described above.

The device of the present disclosure solves one or more of the problems set forth above and/or other problems in the art.

SUMMARY

A method by a device includes receiving, from one or more sensor devices associated with a first machine located at a job site, motion data of the first machine during a period of time; determining, based on the motion data, an amount of time the first machine spent performing one or more tasks, at the job site, during the period of time; determining, based on task information regarding the one or more tasks, that the first machine is performing the one or more tasks by interacting with a second machine; determining a quantity of work cycles performed by the first machine during the period of time; generating, based on the amount of time and the quantity of work cycles, a productivity value indicating a measure of productivity of the first machine during the period of time; determining, based on the productivity value, that the second machine is not registered as a machine that is performing work at the job site; and performing an action to cause second machine information regarding the second machine to be associated with job site information regarding the job site to register the second machine as a machine that is performing work at the job site.

A device includes one or more memories and one or more processors configured to: receive, from one or more sensor devices associated with a first machine located at a job site, motion data of the first machine during a period of time; determine, based on the motion data, that the first machine is performing one or more tasks, at the job site, during the period of time; determine that the first machine is performing the one or more tasks by interacting with a second machine; determine a quantity of work cycles performed by the first machine, via interactions with the second machine, during the period of time; determine, based on the quantity of work cycles, that the second machine has not been registered as a machine that is performing work at the job site; and provide, to a job site device associated with the job site, a notification indicating that the second machine is not registered as a machine that is performing work at the job site, based on determining that the second machine has not been registered, wherein the notification includes one or more instructions to cause the job site device to update job site information regarding the job site to include second machine information regarding the second machine.

A system includes a first machine located at a job site, and a device configured to: receive, from one or more sensor devices associated with the first machine, motion data of the first machine during a period of time; determine, based on the motion data, an amount of time the first machine spent performing one or more tasks, at the job site, during the period of time; determine, based on task information regarding the one or more tasks, that the first machine is performing the one or more tasks by interacting with a second machine; determine a quantity of work cycles performed by the first machine during the period of time; determine that the quantity of work cycles does not match an expected quantity of work cycles expected to be performed by the first machine based on the amount of time; determine that the second machine is an unknown machine performing work at the job site, based on determining that the quantity of work cycles does not match the expected quantity of work cycles; and perform an action to cause the second machine to be registered as machine performing work at the job site, based on determining the second machine is an unknown machine performing work at the job site.

BRIEF DESCRIPTION OF THE DRAWINGS

FIG. 5 is a flowchart of an example process relating to detecting a missing asset.

DETAILED DESCRIPTION

The present disclosure is directed to a system that detects whether a first machine (registered to perform work at a job site) is interacting with a second machine (not registered to perform work at a job site). For example, the system may determine a quantity of work cycles associated with the first machine interacting with the second machine. The system may determine that the quantity of work cycles is inaccurate. Accordingly, the system may determine that the second machine is not registered as a machine performing work at the job site. In this regard, the system may cause the second machine to be registered. For example, the system may cause job site information regarding the job site to include second information regarding the second machine. In some instances, a virtual representation of the job site may be updated to include the second information regarding the second machine. By causing the second machine to be registered, the system may be able to establish a connection with the second machine and obtain, from the second machine, data that may be used to determine the quantity of work cycles.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
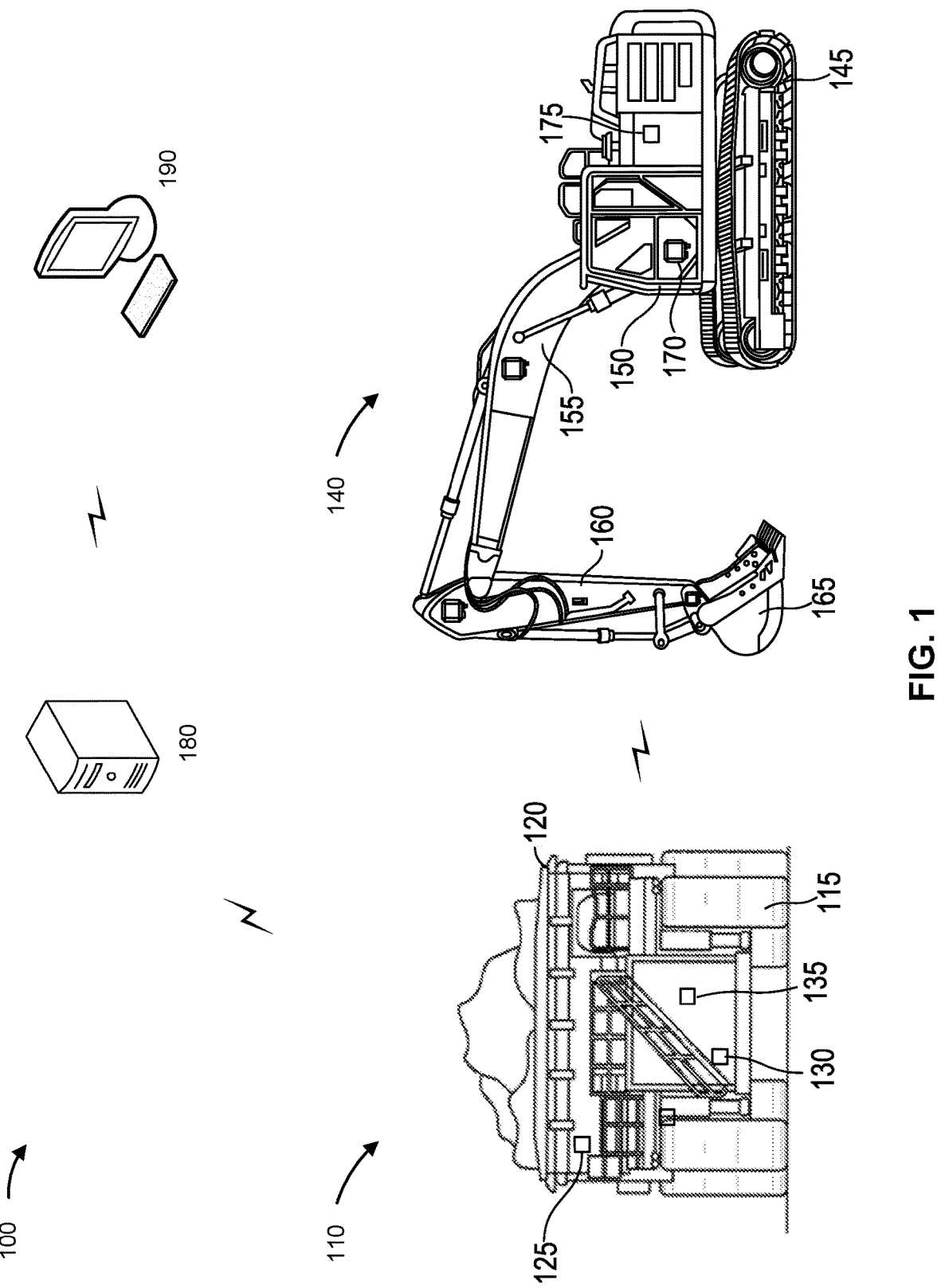
FIG. 1 is a diagram of an example implementation described herein.

FIG. 1 is a diagram of an example implementation 100 described herein. As shown in FIG. 1, the example implementation 100 includes a first machine 110, a second machine 140, a machine productivity device 180, and a job site device 190 associated with a job site. The job site may include a quarry operation, a mining operation, or a road construction operation, among other examples. First machine 110 and second machine 140 may be located at the job site.

As shown in FIG. 1, first machine 110 is embodied as a hauling machine such as a mining truck, a haul truck, a dump truck, and/or a similar machine. As shown in FIG. 1, second machine 140 is embodied as a loading machine, such as an excavator. Alternatively, second machine 140 may be another type of loading machine such as, for example, a dozer, a wheel loader, and/or a similar machine. In some examples, second machine 140 may load (or move) material into first machine 110 (e.g., into a truck bed of first machine 110). In some implementations, first machine 110 and/or second machine 140 may be configured to operate autonomously and/or semi-autonomously.

As shown in FIG. 1, first machine 110 includes ground engaging members 115, a truck bed 120, a sensor device 125, a location device 130, and a wireless communication component 135. Ground engaging members 115 may be configured to propel first machine 110. Ground engaging members 115 may include wheels, rollers, or tracks, among other examples. Ground engaging members 115 may be mounted on a machine body and driven by one or more engines and drive trains (not shown). Truck bed 120 may be used to receive material (e.g., loaded into truck bed 120 by second machine 140). Material may include ground material (e.g., material obtained from earth).

Sensor device 125 may include one or more devices that are configured to sense a motion of first machine 110 and generate motion data indicating the motion of first machine 110. In some examples, sensor device 125 may include an inertial measurement unit (IMU). For example, the IMU may include one or more devices that are capable of receiving, generating, storing, processing, and/or providing signals indicating the motion of first machine 110 and/or indicating a position and an orientation of a component, of first machine 110, on which the IMU is installed.

The IMU may include one or more accelerometers and/or one or more gyroscopes. The one or more accelerometers and/or the one or more gyroscopes generate and provide signals that can be used to detect the motion of first machine 110 and/or determine a position and an orientation of the IMU relative to a frame of reference and, accordingly, the position and the orientation of the component. While the example discussed herein refers to IMUs, the present disclosure is applicable to using one or more other types of sensor devices that may be used to determine the motion of first machine 110 and/or determine a position and an orientation of a component of first machine 110.

Location device 130 may include one or more devices that are capable of receiving, generating, storing, processing, and/or providing signals indicating a location of first machine 110. For example, location device 130 may generate first location data identifying locations of first machine 110 (e.g., at the job site). As an example, location device 130 may include a global positioning system (GPS) device.

Wireless communication component 135 may include one or more devices that are capable of communicating with one or more other machines (e.g., second machine 140) and/or one or more devices (e.g., machine productivity device 180 and/or a job site device 190), as described herein. Wireless communication component 135 may include a transceiver, a separate transmitter and receiver, an antenna, and/or the like. Wireless communication component 135 may communicate with the one or more machines using a short-range wireless communication protocol such as, for example, BLUETOOTH® Low-Energy, BLUETOOTH®, Wi-Fi, near-field communication (NFC), Z-Wave, ZigBee, or Institute of Electrical and Electronics Engineers (IEEE) 802.154, among other examples.

Additionally, or alternatively, wireless communication component 135 may communicate with the one or more other machines and/or the one or more devices via a network that includes one or more wired and/or wireless networks, such as, for example, a wireless local area network (LAN), a cellular network (e.g., a long-term evolution (LTE) network, a code division multiple access (CDMA) network, a 3G network, a 4G network, a 5G network, or another type of cellular network), a public land mobile network (PLMN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

As shown in FIG. 1, second machine 140 includes ground engaging members 145, a machine body 150, a boom 155, a stick 160, and a machine work tool 165. Ground engaging members 145 may include tracks (as shown in FIG. 1), wheels, or rollers, among other examples, for propelling second machine 140. Ground engaging members 145 may be mounted a rotating frame (not shown) and driven by one or more engines and drive trains (not shown). Machine body 150 may be mounted on the rotating frame (not shown). Machine body 150 may support an operator cabin mounted on the rotating frame. The operator cabin may include an integrated display (not shown) and operator controls such as, for example, an integrated joystick and/or one or more input components.

For an autonomous machine, the operator controls may not be designed for use by an operator and, rather, may be designed to operate independently from an operator. In this case, for example, the operator controls may include one or more input components that provide an input signal for use by another component without any operator input.

Boom 155 is pivotally mounted at its proximal end to machine body 150 and is articulated relative to machine body 150 by one or more fluid actuation cylinders (e.g., hydraulic or pneumatic cylinders), electric motors, and/or other electro-mechanical components. Stick 160 is pivotally mounted at a distal end of boom 155 and is articulated relative to boom 155 by one or more fluid actuation cylinders, electric motors, and/or other electro-mechanical components. Boom 155 and/or stick 160 may be referred to as a linkage. Machine work tool 165 is mounted at a distal end of stick 160 and may be articulated relative to stick 160 by one or more fluid actuation cylinders, electric motors, and/or other electro-mechanical components. Machine work tool 165 may be a bucket (as shown in FIG. 1) or another type of tool or implement that may be mounted on stick 160. Machine work tool 165 may be referred to as an implement.

As shown in FIG. 1, second machine 140 includes location device 170 and wireless communication component 175. Location device 170 may be similar to location device 130 described above. Wireless communication component 175 may be similar to wireless communication component 135 described above.

Machine productivity device 180 includes one or more devices capable of receiving, generating, storing, processing, providing, and/or routing information associated with determining a measure of productivity of a machine and/or detecting that the machine is not registered as a machine performing work at the job site. For example, machine productivity device 180 may receive motion data of first machine 110 and/or first location data identifying locations of first machine 110, and may determine a productivity value indicating a measure of productivity of first machine 110, as described below. First machine 110 may interact with second machine 140 to perform one or more tasks at the job site. In this regard, in some situations, machine productivity device 180 may use the productivity value to determine that second machine 140 is not registered as a machine performing work at the job site, as described below.

Machine productivity device 180 may include a communication device and a computing device. For example, machine productivity device 180 may include a server, such as an application server, a client server, a web server, a database server, a host server, a proxy server, a virtual server (e.g., executing on computing hardware), or a server in a cloud computing system. In some implementations, machine productivity device 180 includes computing hardware used in a cloud computing environment.

Job site device 190 includes one or more devices capable of receiving, generating, storing, processing, providing, and/or routing information associated with a measure of productivity at the job site. For example, job site device 190 may receive productivity values for different machines located at the job site and may use the productivity values to determine the measure of productivity at the job site.

Job site device 190 may include a communication device and a computing device. For example, job site device 190 may include a server, such as an application server, a client server, a web server, a database server, a host server, a proxy server, a virtual server (e.g., executing on computing hardware), or a server in a cloud computing system. In some instances, job site device 190 includes computing hardware used in a cloud computing environment.

In some situations, job site device 190 may be configured to generate a virtual representation of the job site. The virtual representation may include a representation of the job site (e.g., a representation of a physical environment). The virtual representation may be a graphical representation such as a two-dimensional rendering of the job site, a three-dimensional rendering of the job site, among other examples. The virtual representation may be generated by using one or image processing techniques to process image data of an environment that includes the job site.

In some examples, the virtual representation may be generated based on job site information regarding the job site. The job site information may include a name of the job site, job site location information identifying a location of the job site, machine information regarding machines associated with the job site, zone information identifying one or more zones associated with tracking movements of material, shift information identifying a daily shift schedule for operators of the machines, among other examples.

The machine information regarding a machine may include information identifying a manufacturer of the machine, information identifying a model of the machine, location data identifying locations of the machine at the job site, information indicating whether the machine is registered as a machine performing work at the job site, and/or information that may be used (e.g., by machine productivity device 180) to communicate with the machine and obtain data from the machine, among other examples. The information (that may be used to communicate with the machine and obtain the data from the machine) includes information regarding a wireless communication component of the machine.

In some situations, the machine information may be used to generate a virtual representation of the machine. The virtual representation of the machine may be included in the virtual representation of the job site. The virtual representation of the machine may be used to visually track the locations of the machine (e.g., based on the location data of the machine) as the machine travels to the locations to perform different tasks at the job site. In some situations, the virtual representation of the machine may be generated and included in the virtual representation of the job site, if the machine is registered as a machine performing work at the job site (e.g., if the machine information includes information indicating that the machine is registered as a machine performing work at the job site).

In some implementations, job site device 190 may cause machine productivity device 180 to generate the virtual representation of the job site. For example, job site device 190 may provide the job site information to machine productivity device 180. Machine productivity device 180 may generate the virtual representation of the job site and provide the virtual representation of the job site to job site device 190.

The number and arrangement of devices and networks shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the example implementation 100 may perform one or more functions described as being performed by another set of devices of the example implementation 100.

Figure 2:
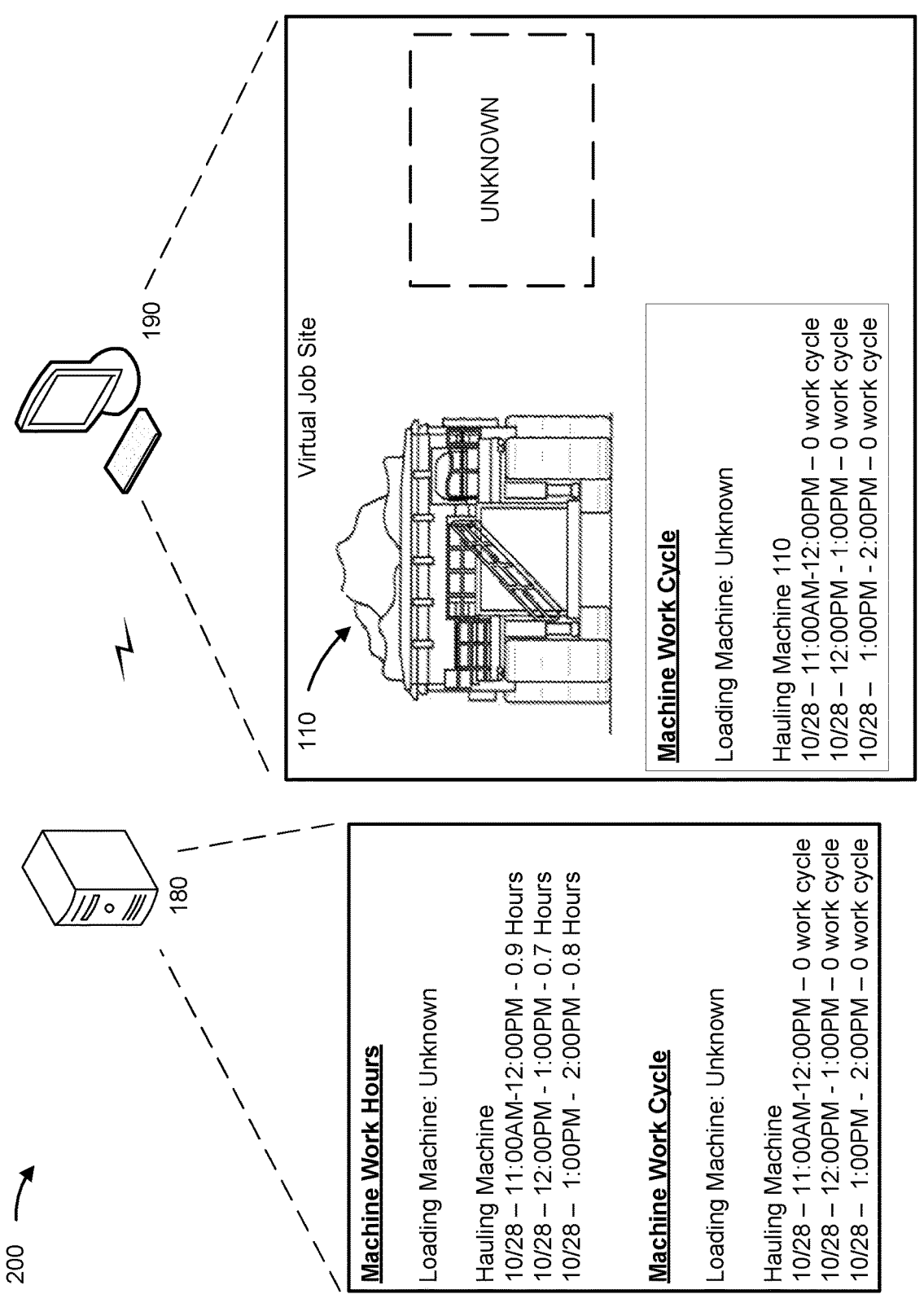
FIG. 2 is a diagram of an example implementation described herein.

FIG. 2 is a diagram of an example implementation 200 described herein. As shown in FIG. 2, the example implementation 200 includes first machine 110, machine productivity device 180, and job site device 190 associated with the job site described above in connection with FIG. 1. In the example that follows, multiple machines are associated with the job site. The multiple machines include a first set of machines (including first machine 110) that are registered as machines performing work at the job site and a second set of machines (including second machine 140) that are not registered as machines performing work at the job site. The job site information and the virtual representation of the job site may include the machine information of the first set of machines.

The job site information and the virtual representation of the job site may include first information regarding first machine 110. As an example, the first information may include information identifying a manufacturer of first machine 110, information identifying a model of first machine 110, the first location data, information indicating that first machine 110 is registered as a machine performing work at the job site, and/or information that may be used to communicate with first machine 110 (e.g., information regarding wireless communication component 135) to obtain data from first machine 110, among other examples. The information regarding wireless communication component 135 may include information identifying a manufacturer of wireless communication component 135, information identifying a model of wireless communication component 135, a name of wireless communication component 135, or a network address of wireless communication component 135, among other examples.

As a result of the first set of machines being registered as machines performing work at the job site, job site device 190 may provide the machine information of the first set of machines to machine productivity device 180. Machine productivity device 180 may use the machine information of the first set of machines to establish a connection with the first set of machines in order to obtain data from the first set of machines. For example, machine productivity device 180 may use the information regarding wireless communication component 135 to establish a connection with wireless communication component 135 in order to obtain data from first machine 110. For instance, machine productivity device 180 may obtain, via the connection, the motion data of first machine 110, the first location data of first machine 110, data identifying an amount of fuel consumed by first machine 110, or data identifying an amount of payload transported by first machine 110, among other examples.

Machine productivity device 180 may be configured to determine a measure of productivity of first machine 110 during a period of time. For example, machine productivity device 180 may be configured to determine the measure of productivity of first machine 110 during a particular hour of a particular day. In this regard, machine productivity device 180 may receive, from sensor device 125 and via the connection, the motion data of first machine 110 and the first location data during the period of time.

Machine productivity device 180 may determine, based on the motion data, an amount of time that the first machine spent performing one or more tasks, at the job site, during the period of time. For example, based on the motion data, machine productivity device 180 may determine an amount of motion time that first machine 110 spent in motion (e.g., an amount of time spent traveling from one location to another location to perform the one or more tasks, or an amount time of time spent moving one or more implements to perform the one or more tasks, among other examples).

In some situations, machine productivity device 180 may determine an amount of idle time of first machine 110. For example, machine productivity device 180 may receive, from first machine 110 and via the connection, idle data indicating when an idle event starts and when the idle event stops. The idle data may be generated by first machine 110 based on sensor device 125. Machine productivity device 180 may determine the amount of idle time of first machine 110 based on the idle data.

Additionally, or alternatively, machine productivity device 180 may determine the amount of idle time of first machine 110 based on the first location data of first machine 110. For example, machine productivity device 180 may use the first location data and timestamps associated with the first location data to determine when first machine 110 is moving or when first machine 110 is not moving, thereby determining when an idle event starts and when the idle event stops. For instance, based on the first location data and the timestamps, machine productivity device 180 may determine that first machine 110 is idling when first machine 110 is not moving (e.g., when first machine 110 remains at a location for a threshold amount of time).

In some instances, machine productivity device 180 may determine a duration of the idle event based on the first location data and the timestamps. Machine productivity device 180 may determine the duration based on an amount of time that first machine 110 remains at a location (e.g., an amount of time that first machine 110 remains stationary). Machine productivity device 180 may determine a type of the idle event based on the duration. For example, when the duration does not satisfy a duration threshold, machine productivity device 180 may determine that the idle event is a productive idle event (e.g., determine that the idle event is associated with performing the one or more tasks). In this regard, machine productivity device 180 may include the duration of the idle event in the amount of time that first machine 110 spent performing the one or more tasks.

As shown in FIG. 2, for example, machine productivity device 180 may determine that during the period of time between 11:00 AM and 12:00 PM, the amount of time that the first machine spent performing the one or more tasks was 0.9 hours. The period of time and the amount of hours provided in FIG. 2 are merely provided as examples. In practice, different periods of time and/or different amounts of hours may be used in different situations.

Machine productivity device 180 may receive, from first machine 110 and/or from job site device 190, task information regarding the one or more tasks. Based on the task information, machine productivity device 180 may determine that first machine 110 is performing the one or more tasks by interacting with another machine. For example, the task information may indicate that the one or more tasks, being performed by first machine 110, are hauling and dumping tasks. In this regard, machine productivity device 180 may determine that the hauling and dumping tasks involve first machine 110 being loaded with material by a loading machine. In the example described herein, first machine 110 may perform the one or more tasks by interacting with second machine 140.

Machine productivity device 180 may determine a quantity of work cycles performed by first machine 110 during the period of time. As an example, a work cycle (associated with the one or more tasks) may include a loading event (e.g., an event during which first machine 110 is loaded with material by the loading machine) and a dumping event (e.g., an event during which first machine 110 dumps the material at a dumping location). In this regard, machine productivity device 180 may determine the work cycle based on determining the loading event and the dumping event.

In some instances, machine productivity device 180 may use the first location and the timestamps to determine stopped events associated with the one or more tasks. A stopped event may refer to an event during which first machine 110 is stationary (or stopped) after first machine 110 has traveled a threshold distance as part of performing a task. For example, machine productivity device 180 may determine a first stopped event corresponding to the loading event and a second stopped event corresponding to the dumping event.

With respect to the first stopped event, machine productivity device 180 may determine whether first machine 110 is located within a first threshold distance of a loading machine when first machine 110 is stationary. With respect to the second stopped event, machine productivity device 180 may determine whether a hauling machine is located within a second threshold distance of a zone identified as a dumping zone. Machine productivity device 180 may determine a location of the dumping zone based on the zone information identifying one or more zones associated with tracking movements of material. Machine productivity device 180 may receive the first threshold distance and the second threshold distance from job site device 190. Additionally, or alternatively, machine productivity device 180 may be pre-configured with the first threshold distance and the second threshold distance.

In some instances, machine productivity device 180 may search the machine information of the first set of machines (excluding first machine 110) to identify loading machines located within the first threshold distance of first machine 110. For example, machine productivity device 180 search the machine information of the first set of machines to identify the loading machines, based on the task information indicating the hauling and dumping tasks.

Additionally, machine productivity device 180 may search the machine information of the first set of machines using the first location data to identify the identified loading machines that are located within the second threshold distance of first machine 110 during the period of time. With respect to the second stopped event, machine productivity device 180 may compare the locations of first machine 110 (identified in the first location data) and the dumping location to determine whether first machine 110 has been located with the second threshold distance of the dumping location.

First machine 110 may perform the one or more tasks by interacting with second machine 140. Second machine 140 may not have been registered as a machine performing work at the job site and, accordingly, machine productivity device 180 may not have established a connection with second machine 140 to obtain data from second machine 140 (such as location data identifying locations of second machine 140 at the job site). Machine productivity device 180 may determine, based on the search, that first machine 110 has not been located within the first threshold distance of any loading machine during the period of time.

Machine productivity device 180 may determine that first machine 110 has been located at least one time within the second threshold distance of the dumping zone (e.g., based on comparing the locations of first machine 110 and the dumping location). Machine productivity device 180 may determine that no loading event has been detected and that at least one dumping event has detected. Because machine productivity device 180 determines that no loading event has been detected, machine productivity device 180 may determine that first machine 110 has not performed a work cycle (e.g., a complete work cycle), although at least one dumping event has occurred. For example, machine productivity device 180 may determine that the quantity of work cycles, performed by first machine 110 during the period of time, is 0 (zero). As shown in FIG. 2, for example, machine productivity device 180 may determine that, during the period of time between 11:00 AM and 12:00 PM, first machine 110 did not perform any work cycle.

Machine productivity device 180 may generate, based on the amount of time and the quantity of work cycles during the period of time, a productivity value indicating the measure of productivity of the first machine during the period of time. For example, machine productivity device 180 may combine the amount of time and the quantity of work cycles, using a mathematical operation, to generate the productivity value. For instance, machine productivity device 180 may divide the amount of time by the quantity of work cycles.

Dividing the amount of time by the quantity of work cycles using division is merely provided as an example. In practice, the amount of time and the quantity of work cycles may be combined using one or more other mathematical operations (e.g., addition, multiplication, and/or subtraction), or combined using a combination of mathematical operations (e.g., a combination of subtraction, multiplication, division, and/or addition), among other examples.

Machine productivity device 180 may provide information identifying the amount of cycles to job site device 190 for display. As shown in FIG. 2, for example, job site device 190 may display a virtual representation of the job site, a virtual representation of first machine 110, and the information identifying the amount of cycles.

Based on the productivity value, machine productivity device 180 may determine that first machine 110 is interacting with a machine that is not registered as a machine that is performing work at the job site. In other words, machine productivity device 180 may determine that second machine 140 is an unknown machine performing work at the job site. As an example, machine productivity device 180 may determine that the productivity value does not satisfy a threshold value. In some instances, the threshold value may be 1. The threshold value of 1 is merely provided as an example. In practice, a different threshold value may be used in different situations. Based on determining that the productivity value does not satisfy the threshold value, machine productivity device 180 may determine that first machine 110 is interacting with a machine that is not registered as a machine that is performing work at the job site.

In some examples, machine productivity device 180 may determine that first machine 110 is interacting with a machine that is not registered as a machine that is performing work at the job site based on determining that first machine 110 is performing the one or more tasks by interacting with another machine, based on determining that the amount of time that first machine 110 spent performing the one or more tasks satisfies a threshold amount of time, and/or based on determining that first machine 110 has performed a portion of the work cycle (e.g., based on the at least one dumping event being detected).

In some examples, machine productivity device 180 may determine, based on the amount of time and the first location data, an expected quantity of work cycles expected to be performed by first machine 110 during the period of time.

For example, based on the amount of time, the locations of first machine 110, and first machine 110 being located within the second threshold distance of the dumping location, machine productivity device 180 may determine that first machine 110 performed at least one work cycle. In other words, machine productivity device 180 may determine the expected quantity of work cycles to be at least one. Machine productivity device 180 may determine that the quantity of work cycles (e.g., 0) does not match the expected quantity of work cycles (e.g., 1) expected to be performed by the first machine. Accordingly, machine productivity device 180 may determine that first machine 110 is interacting with a machine that is not registered as a machine that is performing work at the job site In some instances, machine productivity device 180 may determine that first machine 110 is interacting with a machine that is not registered as a machine that is performing work at the job site based on determining that first machine 110 was not located within the first threshold distance of any loading machine and/or of any machine registered as performing work at the job site during the period of time.

In some examples, machine productivity device 180 may perform an action to cause second machine 140 to be registered as a machine that is performing work at the job site. For example, machine productivity device 180 may perform the action to cause second machine information regarding second machine 140 to be included in the machine information of the first set of machines.

In some situations, when performing the action, machine productivity device 180 may provide, to job site device 190, a notification indicating that first machine 110 is interacting with a machine that is not registered as a machine that is performing work at the job site. In some instances, machine productivity device 180 may provide the notification after determining that the productivity value does not satisfy a threshold productivity value a single time. In some instances, machine productivity device 180 may provide the notification after determining that the productivity value does not satisfy the threshold productivity value multiple times.

The notification may include the first machine information (which includes the first location data of second machine 140) and the task information. The notification may further include one or more instructions to cause the job site device to update the job site information to include the second machine information in the job site information in order to register second machine 140 as a machine performing work at the job site.

As an example, the one or more instructions may cause job site device 190 to search the machine information of the second set of machines to identify loading machines that have been located within the first threshold distance of first machine 110 during the period of time. Based on the search, job site device 190 may identify second machine 140 and may include the second machine information in the job site information to register the second machine. The one or more instructions may further cause job site device 190 to update the virtual representation of the job site to include the second machine information to register the second machine.

In some situations, machine productivity device 180 may obtain (e.g., from job site device 190 and/or from a data structure associated with job site device 190) the machine information of the second set of machines. Machine productivity device 180 may search the machine information and update the job site information to include the second machine information in a manner similar to the manner described above.

After second machine 140 is registered, machine productivity device 180 may establish a connection with second machine 140, in a manner similar to the manner described above. Machine productivity device 180 may obtain data from second machine 140, via the connection, and redetermine the quantity of work cycles performed by first machine 110 based on the data obtained from second machine 140.

In some situations, based on determining that first machine 110 is interacting with a machine that is not registered as a machine performing work at the job site, machine productivity device 180 may cause first machine 110 to navigate to a third machine (e.g., another hauling machine) to perform one or more additional tasks at the job site. The one or more additional tasks may include tasks that are performed via interactions with the third machine (e.g., one or more additional loading and dumping tasks).

The third machine may be registered as a machine that is performing work at the job site. For example, machine productivity device 180 may obtain (e.g., from job site device 190 and/or from a data structure associated with job site device 190) the machine information of the first set of machines. Machine productivity device 180 may search the machine information to identify a loading machine (e.g., the third machine).

Machine productivity device 180 may determine a location of the third machine, based on the machine information of the third machine, and may provide an instruction to first machine 110 to cause first machine 110 to navigate to the third machine to perform the one or more additional tasks. The instruction may include information identifying the location of the third machine and/or a set of navigation instructions to navigate to the location of the third machine. In some situations, the instruction may cause first machine 110 to autonomously or semi-autonomously navigate to the location of the third machine.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example implementation 200 may perform one or more functions described as being performed by another set of devices of the example implementation 100.

Figure 3:
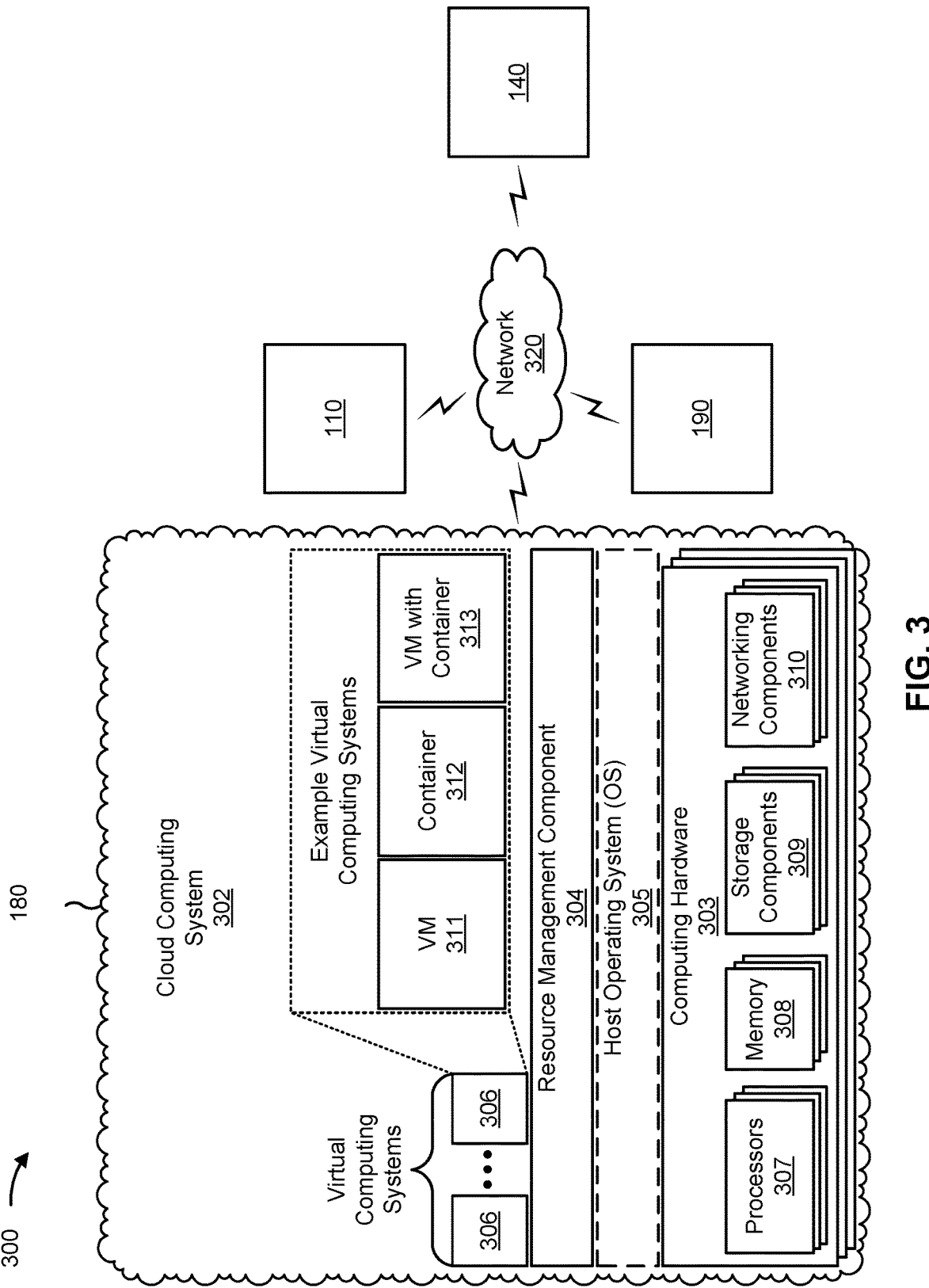
FIG. 3 is a diagram of an example environment described herein.

FIG. 3 is a diagram of an example environment 300 in which systems and/or methods described herein may be implemented. As shown in FIG. 3, environment 300 may include a machine productivity device 180, which may include one or more elements of and/or may execute within a cloud computing system 302. The cloud computing system 302 may include one or more elements 303-313, as described in more detail below. As further shown in FIG. 3, environment 300 may include a network 320, first machine 110, second machine 140, and/or job site device 190. First machine 110, second machine 140, and job site device 190 have been described above in connection with FIGS. 1 and 2. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some examples, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the machine productivity device 180 may include one or more elements 303-313 of the cloud computing system 302, may execute within the cloud computing system 302, and/or may be hosted within the cloud computing system 302, in some implementations, the machine productivity device 180 may not be cloud-based (e.g., may be implemented outside of a cloud computing system) or may be partially cloud-based. For example, the machine productivity device 180 may include one or more devices that are not part of the cloud computing system 302 which may include a standalone server or another type of computing device. The machine productivity device 180 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
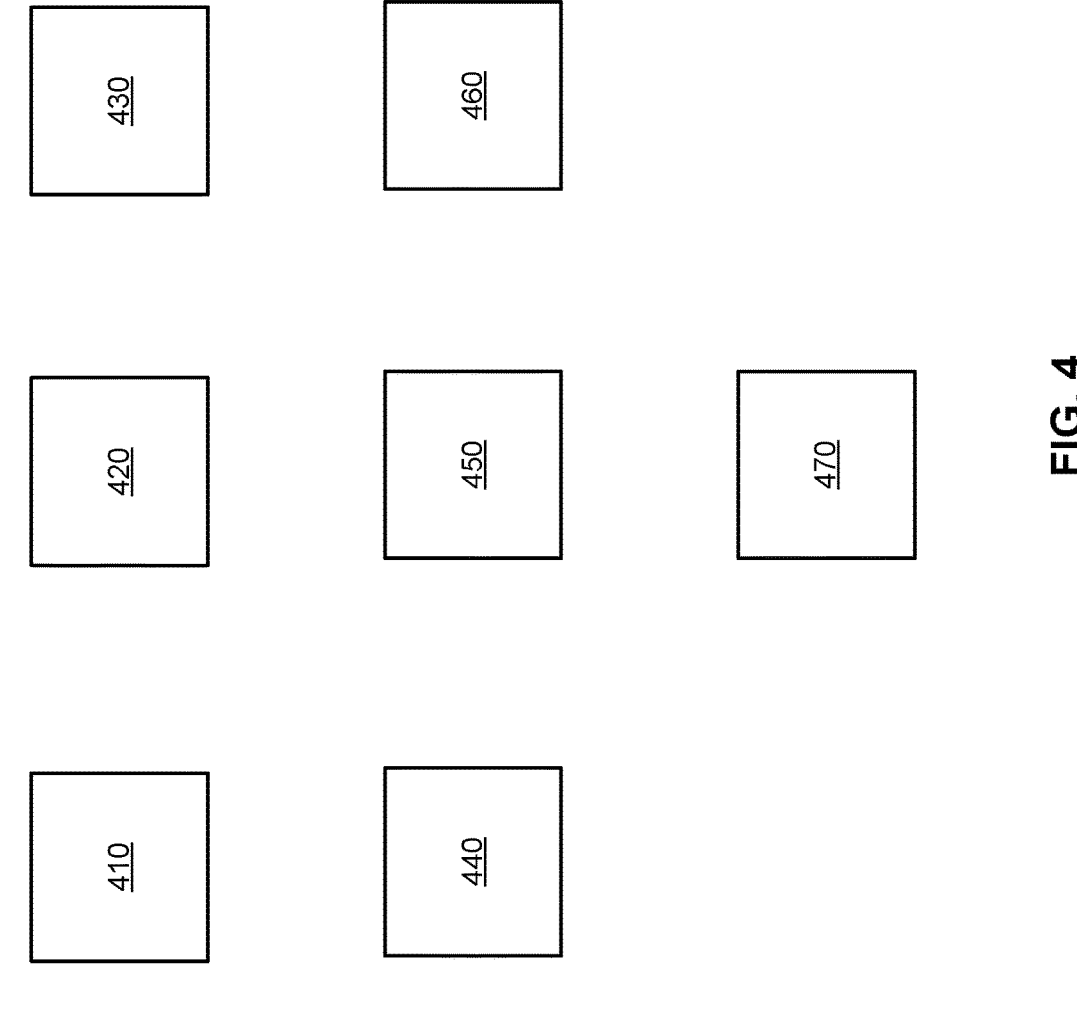
FIG. 4 is a diagram of an example system described herein.

FIG. 4 is a diagram of an example system 400 described herein. As shown in FIG. 4, example system 400 includes a motion circuitry 410, a work time circuitry 420, a task circuitry 430, a work cycle circuitry 440, a productivity circuitry 450, a missing asset circuitry 460, and a registration circuitry 470. In some implementations, example system 400 may be implemented on machine productivity device 180.

Motion circuitry 410 may include one or more components or devices configured to receive motion data of first machine 110, as described herein. Work time circuitry 420 may include one or more components or devices configured to determine, based on the motion data, an amount of time first machine 110 spent performing one or more tasks, as described herein. Task circuitry 430 may include one or more components or devices configured to determine, based on the task information regarding the one or more tasks, that first machine 110 is performing the one or more tasks by interacting with second machine 140, as described herein.

Work cycle circuitry 440 may include one or more components or devices configured to determine a quantity of work cycles performed by first machine 110, as described herein. Productivity circuitry 450 may include one or more components or devices configured to generate, based on the amount of time and the quantity of work cycles, a productivity value indicating a measure of productivity of first machine 110, as described herein. Missing asset circuitry 460 may include one or more components or devices configured to determine, based on the productivity value, that second machine 140 is not registered as a machine that is performing work at the job site, as described herein. Registration circuitry 470 may include one or more components or devices configured to cause second machine 140 to be registered as a machine that is performing work at the job site, as described herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of system 400 may perform one or more functions described as being performed by another set of devices of system 400.

FIG. 5 is a flowchart of an example process 500 associated with detecting a missing asset. In some implementations, one or more process blocks of FIG. 5 may be performed by a machine productivity device (e.g., machine productivity device 180). In some implementations, one or more process blocks of FIG. 5 may be performed by another device or a group of devices separate from or including the machine productivity device, such as a first machine (e.g., first machine 110), a second machine (e.g., second machine 140), and/or a job site device (e.g., job site device 190).

As shown in FIG. 5, process 500 may include receiving, from one or more sensor devices associated with a first machine located at a job site, motion data of the first machine during a period of time (block 510). For example, the machine productivity platform may receive, from one or more sensor devices associated with a first machine located at a job site, motion data of the first machine during a period of time, as described above.

As further shown in FIG. 4, process 500 may include determining, based on the motion data, an amount of time that the first machine spent performing one or more tasks, at the job site, during the period of time (block 520). For example, the machine productivity platform may determine, based on the motion data, an amount of time that the first machine spent performing one or more tasks, at the job site, during the period of time, as described above.

In some implementations, determining the amount of time comprises determining a duration of an idle event of the first machine, determining that the duration does not satisfy a duration threshold, and determining the amount of time using the duration based on determining that the duration does not satisfy the duration threshold.

As further shown in FIG. 4, process 500 may include determining, based on task information regarding the one or more tasks, that the first machine is performing the one or more tasks by interacting with a second machine (block 530). For example, the machine productivity platform may determine, based on task information regarding the one or more tasks, that the first machine is performing the one or more tasks by interacting with a second machine, as described above.

As further shown in FIG. 4, process 500 may include determining a quantity of work cycles performed by the first machine during the period of time (block 440). For example, the machine productivity platform may determine a quantity of work cycles performed by the first machine during the period of time, as described above.

As further shown in FIG. 4, process 500 may include generating, based on the amount of time and the quantity of work cycles, a productivity value indicating a measure of productivity of the first machine during the period of time (block 550). For example, the machine productivity platform may generate, based on the amount of time and the quantity of work cycles, a productivity value indicating a measure of productivity of the first machine during the period of time, as described above.

As further shown in FIG. 4, process 500 may include determining, based on the productivity value, that the second machine is not registered as a machine that is performing work at the job site (block 560). For example, the machine productivity platform may determine, based on the productivity value, that the second machine is not registered as a machine that is performing work at the job site, as described above.

In some implementations, process 500 includes receiving, from a location device of the first machine, first location data identifying locations of the first machine during the period of time; receiving, from location devices of one or more other machines, second location data identifying locations of the one or more other machines during the period of time, wherein the first machine and the one or more other machines are registered as machines performing work at the job site during the period of time; determining, based on the first location data and the second location data, that the first machine was not located within a threshold distance of any machine registered as performing work at the job site during the period of time; and determining that the second machine is not registered as a machine that is performing work at the job site, based on determining that the first machine was not located within the threshold distance of any machine registered as performing work at the job site during the period of time.

In some implementations, determining that the second machine is not registered as a machine that is performing work at the job site comprises determining that the productivity value does not satisfy a threshold value, and determining that the second machine is not registered as a machine that is performing work at the job site based on determining that the productivity value does not satisfy the threshold value.

As further shown in FIG. 4, process 500 may include performing an action to cause second machine information regarding the second machine to be associated with job site information regarding the job site to register the second machine as a machine that is performing work at the job site (block 570). For example, the machine productivity platform may perform an action to cause second machine information regarding the second machine to be associated with job site information regarding the job site to register the second machine as a machine that is performing work at the job site, as described above.

In some implementations, performing the action comprises providing, to a job site device associated with the job site, a notification indicating that the second machine is not registered as a machine that is performing work at the job site, wherein the notification includes one or more instructions to cause the job site device to update a virtual representation of the job site, based on the second machine information, to register the second machine as a machine that is performing work at the job site.

In some implementations, process 500 includes identifying a third machine registered as a machine that is performing work at the job site, based on determining that the second machine is not registered as a machine that is performing work at the job site, and causing the first machine to navigate to the third machine to perform one or more additional tasks at the job site, wherein the one or more additional tasks are performed via interactions with the third machine.

In some implementations, performing the action comprises causing the job site information to be updated to include the second machine information, wherein the second machine information includes at least one of information identifying a manufacturer of the second machine or information identifying a model of the second machine.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The present disclosure is directed to a system that detects whether a first machine (registered to perform work at a job site) is interacting with a second machine (not registered to perform work at a job site). For example, the system may determine a quantity of work cycles associated with the first machine interacting with the second machine. The system may determine that the quantity of work cycles is inaccurate. Accordingly, the system may determine that the second machine is not registered as a machine performing work at the job site. In this regard, the system may cause the second machine to be registered.

The system may prevent the job site device from using an inaccurate quantity of work cycles. When the inaccurate quantity of work cycles is used by the job site device, the job site device may generate inaccurate data regarding the job site. Generating inaccurate data in this manner may waste computing resources, network resources, and other resources associated with determining whether the first machine is experiencing a failure, re-determining a location of the first machine, determining whether the job site device is experiencing a failure, among other examples.

By detecting that the second machine is not registered and by causing the second machine to be registered, the system may prevent the job site device from using an inaccurate quantity of work cycles to generate inaccurate data regarding the job site. Accordingly, the system may preserve computing resources, network resources, and other resources that would have otherwise been wasted by determining whether the first machine is experiencing a failure, re-determining a location of the first machine, determining whether the job site device is experiencing a failure, among other examples.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method, comprising:

receiving, by a device, from one or more sensor devices associated with a first machine located at a job site, motion data of the first machine during a period of time;

determining, by the device, based on the motion data, an amount of time the first machine spent performing one or more tasks, at the job site, during the period of time;

determining, by the device, based on task information regarding the one or more tasks, that the first machine is performing the one or more tasks by interacting with a second machine;

determining, by the device, a quantity of work cycles performed by the first machine during the period of time;

generating, by the device, based on the amount of time and the quantity of work cycles, a productivity value indicating a measure of productivity of the first machine during the period of time;

determining, by the device and based on the productivity value, that the second machine is not registered with a second device associated with the job site as a machine that is performing work at the job site;

obtaining, by the device and based on determining that the second machine is not registered with a second device, a set of second machine information associated with a set of second machines including the second machine;

identifying, by the device, based on first location data of the first machine during the first machine performing the one or more tasks, and further based on the task information, the second machine from the set of second machines;

performing, by the device and based on identifying the second machine, an action associated with registering the second machine with the second device as a machine that is performing work at the job site;

establishing, by the device and based on performing the action, a connection with the second machine;

obtaining, by the device and based on establishing the connection, data from the second machine;

redetermining, by the device and based on the data, the quantity of work cycles performed by the first machine;

identifying, by the device and based on determining that the second machine is not registered with the second device as a machine that is performing work at the job site, a third machine registered as a machine that is performing work at the job site; and sending, by the device and based on the third machine being identified as the machine that is performing the work at the job site, a signal, to the first machine, comprising one or more instructions to autonomously navigate to the third machine to perform one or more additional tasks at the job site.

2. The method of claim 1, wherein performing the action comprises:

providing, to the second device, a notification indicating that the second machine is not registered with the second device as a machine that is performing work at the job site, wherein the notification includes one or more instructions to cause the second device to update a virtual representation of the job site to register the second machine with the second device as a machine that is performing work at the job site.

3. The method of claim 1, further comprising:

receiving, from a location device of the first machine, second location data identifying locations of the first machine during the period of time;

receiving, from one or more other location devices of one or more other machines, third location data identifying locations of the one or more other machines during the period of time, wherein the first machine and the one or more other machines are registered with the second device as machines performing work at the job site during the period of time; and determining, based on the second location data and the third location data, that the first machine was not located within a threshold distance of any machine registered with the second device as performing work at the job site during the period of time, wherein the second machine is determined not to be registered with the second device further based on determining that the first machine was not located within the threshold distance of any machine registered as performing work at the job site during the period of time.

4. The method of claim 1, wherein determining that the second machine is not registered with the second device comprises:

determining that the productivity value does not satisfy a threshold value; and determining that the second machine is not registered with the second device as a machine that is performing work at the job site based on determining that the productivity value does not satisfy the threshold value.

5. The method of claim 1, wherein performing the action comprises:

causing job site information associated with the job site to be updated to include second machine information associated with the second machine, wherein the second machine information includes at least one of information identifying a manufacturer of the second machine or information identifying a model of the second machine.

6. The method of claim 1, wherein determining the amount of time comprises:

determining a duration of an idle event of the first machine;

determining that the duration does not satisfy a duration threshold; and determining the amount of time using the duration based on determining that the duration does not satisfy the duration threshold.

7. A device, comprising:

one or more memories; and one or more processors, coupled to the one or more memories, configured to:

receive, from one or more sensor devices associated with a first machine located at a job site, motion data of the first machine during a period of time;

determine, based on the motion data, that the first machine is performing one or more tasks, at the job site, during the period of time;

determine that the first machine is performing the one or more tasks by interacting with a second machine;

determine a quantity of work cycles performed by the first machine, via interactions with the second machine, during the period of time;

determine, based on the quantity of work cycles, that the second machine has not been registered with a second device associated with the job site as a machine that is performing work at the job site;

obtain, based on determining that the second machine is not registered with a second device, a set of second machine information associated with a set of second machines including the second machine;

identify, based on first location data of the first machine during the first machine performing the one or more tasks, and further based on task information regarding the one or more tasks, the second machine from the set of second machines;

provide, to the second device and based on identifying the second-device machine, a notification indicating that the second machine is not registered with the second device as a machine that is performing work at the job site, wherein the notification includes one or more instructions to cause the second device to update job site information regarding the job site to include second machine information regarding the second machine;

establish, based on providing the notification, a connection with the second machine;

obtain, based on establishing the connection, data from the second machine;

redetermine, based on the data, the quantity of work cycles performed by the first machine;

identify, based on determining that the second machine is not registered with the second device as a machine that is performing work at the job site, a third machine registered as a machine that is performing work at the job site; and send, based on the third machine being identified as the machine that is performing the work at the job site, a signal, to the first machine, comprising one or more instructions to autonomously navigate to the third machine to perform one or more additional tasks at the job site.

8. The device of claim 7, wherein, to determine the quantity of work cycles, the one or more processors are configured to:

receive, from a location device of the first machine, second location data identifying locations of the first machine during the period of time; and determine the quantity of work cycles based on the second location data.

9. The device of claim 7, wherein the one or more processors are further configured to:

determine, based on the motion data, an amount of time the first machine spent performing the one or more tasks during the period of time; and generate, based on the amount of time and the quantity of work cycles, a productivity value indicating a measure of productivity of the first machine during the period of time, and wherein, to determine that the second machine has not been registered with the second device, the one or more processors are configured to:

determine, using the productivity value, that the second machine has not been registered with the second device as a machine that is performing work at the job site.

10. The device of claim 9, wherein, to generate the productivity value, the one or more processors are configured to:

combine the amount of time and the quantity of work cycles, using a mathematical operation, to generate the productivity value; and wherein, to determine that the second machine has not been registered with the second device, the one or more processors are configured to:

determine that the productivity value does not satisfy a threshold value; and determine that the second machine has not been registered with the second device as a machine that is performing work at the job site, based on determining that the productivity value does not satisfy the threshold value.

11. The device of claim 9, wherein the one or more processors are further configured to:

receive, from a location device of the first machine, second location data identifying locations of the first machine during the period of time;

determining, using the second location data and third location data of machines registered with the second device, that the first machine was not located within a threshold distance of any machine registered as performing work at the job site during the period of time, wherein, to determine that the second machine has not been registered with the second device, the one or more processors are configured to:

determine that the second machine has not been registered with the second device as a machine that is performing work at the job site based on determining that the first machine was not located within a threshold distance of any machine registered as performing work at the job site during the period of time.

12. The device of claim 9, wherein, to determine that the second machine has not been registered with the second device, the one or more processors are configured to:

determine, based on the amount of time and the quantity of work cycles, that the second machine information is not associated with a virtual representation of the job site, wherein the notification includes one or more instructions to cause the second device to update the virtual representation of the job site to include the second machine information to register the second machine.

13. The device of claim 9, wherein, to determine that the second machine has not been registered with the second device, the one or more processors are configured to:

receive, from a location device of the first machine, second location data identifying locations of the first machine during the period of time;

determine, based on the amount of time and the second location data, an expected quantity of work cycles expected to be performed by the first machine during the period of time;

determine that the quantity of work cycles does not match the expected quantity of work cycles expected to be performed by the first machine; and determine that the second machine has not been registered with the second device based on determining that the quantity of work cycles does not match the expected quantity of work cycles.

14. A system, comprising:

a first machine located at a job site; and a device configured to:

receive, from one or more sensor devices associated with the first machine, motion data of the first machine during a period of time;

determine, based on the motion data, an amount of time the first machine spent performing one or more tasks, at the job site, during the period of time;

determine, based on task information regarding the one or more tasks, that the first machine is performing the one or more tasks by interacting with a second machine;

determine a quantity of work cycles performed by the first machine during the period of time;

determine that the quantity of work cycles does not match an expected quantity of work cycles expected to be performed by the first machine based on the amount of time;

determine that the second machine is an unknown machine, of a second device associated with the job site, performing work at the job site, based on determining that the quantity of work cycles does not match the expected quantity of work cycles;

obtain, based on determining that the second machine is not registered with a second device, a set of second machine information associated with a set of second machines including the second machine;

identify, based on first location data of the first machine during the first machine performing the one or more tasks, and further based on the task information, the second machine from the set of second machines;

perform, based on identifying the second machine, an action associated with registering the second machine with the second device as a machine performing work at the job site, based on determining the second machine is an unknown machine performing work at the job site;

establish, based on performing the action, a connection with the second machine;

obtain, based on establishing the connection, data from the second machine;

redetermine, based on the data, the quantity of work cycles performed by the first machine;

identify, based on determining that the second machine is not registered with the second device as a machine that is performing work at the job site, a third machine registered as a machine that is performing work at the job site; and send, based on the third machine being identified as the machine that is performing the work at the job site, a signal, to the first machine, comprising one or more instructions to navigate to the third machine to perform one or more additional tasks at the job site.

15. The system of claim 14, wherein the device is further configured to:

receive the task information from the first machine;

identify, based on the task information, a third machine registered with the second device as another machine that is performing work at the job site, based on determining that the second machine is not registered with the second device as a machine that is performing work at the job site; and provide one or more instructions, to the first machine, to cause the first machine to navigate to the third machine and interact with the third machine to perform one or more additional tasks, associated with the third machine, at the job site.

16. The system of claim 14, wherein, to perform the action, the device is configured to:

provide, to the second device, a notification indicating that the second machine is not registered with the second device as a machine performing work at the job site, based on determining that the second machine is an unknown machine, of the second device, performing work at the job site.

17. The system of claim 16, wherein the notification includes one or more instructions to cause the second device to update information regarding the job site to include second machine information regarding the second machine.

18. The system of claim 14, wherein, to perform the action, the device is configured to:

provide, to the second device, a notification indicating that the second machine is not registered with the second device as a machine performing work at the job site, based on determining that the second machine is an unknown machine, of the second device, performing work at the job site, wherein the notification includes one or more instructions to cause the second device to update a virtual representation of the job site to include a virtual representation of the first machine.

19. The system of claim 14, wherein, to determine the quantity of work cycles, the device is configured to:

receive, from a location device of the first machine, second location data identifying locations of the first machine during the period of time and timestamps associated with the locations; and determine the quantity of work cycles based on the second location data and the timestamps.

20. The system of claim 14, wherein the device is further configured to:

cause the first machine to provide a notification to the second machine, wherein the notification indicates, to the second machine, that the second machine is not registered with the second device as a machine performing work at the job site, and wherein the notification includes one or more instructions that cause the second machine to register with the second device as a machine that performs work at the job site.

* * * * *